(12) United States Patent
Johnson et al.

(10) Patent No.: US 9,553,623 B2
(45) Date of Patent: Jan. 24, 2017

(54) WIRELESS COMMUNICATION DEVICE

(71) Applicant: AT&T INTELLECTUAL PROPERTY I, L.P., Atlanta, GA (US)

(72) Inventors: Myranda Johnson, Smyrna, GA (US); Victor Mancheno, Cranford, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/752,293

(22) Filed: Jun. 26, 2015

(65) Prior Publication Data

US 2016/0380662 A1    Dec. 29, 2016

(51) Int. Cl.
| | |
|---|---|
| *H04M 1/00* | (2006.01) |
| *H04B 1/3816* | (2015.01) |
| *H04W 48/18* | (2009.01) |
| *H04W 48/14* | (2009.01) |
| *H04W 28/16* | (2009.01) |
| *H04W 88/06* | (2009.01) |

(52) U.S. Cl.
CPC ........... *H04B 1/3816* (2013.01); *H04W 28/16* (2013.01); *H04W 48/14* (2013.01); *H04W 48/18* (2013.01); *H04W 88/06* (2013.01)

(58) Field of Classification Search
CPC ..... H04B 1/3816; H04W 48/14; H04W 48/18; H04W 28/16; H04W 88/06
USPC ............... 455/412.1–414.2, 418–421, 435.2, 455/435.3, 436, 440, 442, 450, 452.2, 455/456.1, 456.2, 456.6, 558, 455/67.11–67.13, 525, 425, 574; 379/211.05, 433.09
See application file for complete search history.

(56) References Cited

U.S. PATENT DOCUMENTS

| | | |
|---|---|---|
| 5,999,811 A | 12/1999 | Molne |
| 7,929,993 B2 | 4/2011 | Nagarajan |
| 8,108,002 B2 | 1/2012 | Lin |
| 8,478,341 B2 | 7/2013 | Torres |
| 8,750,931 B2 | 6/2014 | Park et al. |

(Continued)

FOREIGN PATENT DOCUMENTS

| | | |
|---|---|---|
| EP | 2 437 528 B1 | 7/2013 |
| EP | 2 624 528 B1 | 8/2014 |

(Continued)

OTHER PUBLICATIONS

Chalmers, D., et al, "Survey of Quality of Service in Mobile Computing Environments", IEEE Communications Surveys, vol. 2, Issue 2, 1999, pp. 2-10.

(Continued)

*Primary Examiner* — Babar Sarwar
(74) *Attorney, Agent, or Firm* — Toler Law Group, PC

(57) ABSTRACT

A method includes receiving a request to send data to a destination device. The method includes determining a value associated with QoS of a wireless network. The wireless communication device includes first SIM card information that enables first data delivery according to a first priority via the wireless network and second SIM card information that enables second data delivery via the wireless network according to a second priority at least at a first delivery rate. The method includes determining, based on the value, a throughput value and a first portion of the data to send with the first data delivery. The method also includes determining a second portion of the data to send to the destination device with the second data delivery based on the throughput value, where the second portion includes none of the data when the throughput value is greater than a threshold.

20 Claims, 5 Drawing Sheets

(56) References Cited

U.S. PATENT DOCUMENTS

| | | | |
|---|---|---|---|
| 8,787,966 B2 | 7/2014 | Altman | |
| 8,849,350 B1* | 9/2014 | Batchu | H04W 52/0216 |
| | | | 455/558 |
| 8,873,560 B2 | 10/2014 | Frusina et al. | |
| 8,874,168 B2 | 10/2014 | Luo | |
| 8,914,035 B2 | 12/2014 | Roullier | |
| 8,971,960 B2 | 3/2015 | Kim | |
| 2010/0022236 A1* | 1/2010 | Ji | H04M 1/72519 |
| | | | 455/422.1 |
| 2010/0173671 A1* | 7/2010 | Cha | H04W 52/0245 |
| | | | 455/556.1 |
| 2010/0240414 A1 | 9/2010 | Lotenberg | |
| 2010/0273524 A1* | 10/2010 | Bae | H04W 48/16 |
| | | | 455/552.1 |
| 2010/0279737 A1* | 11/2010 | Joppek | H04M 1/24 |
| | | | 455/558 |
| 2011/0012987 A1* | 1/2011 | Yoon | H04M 1/72522 |
| | | | 348/14.02 |
| 2011/0077031 A1* | 3/2011 | Kim | H04B 1/3816 |
| | | | 455/458 |
| 2011/0269503 A1* | 11/2011 | Park | H04W 8/183 |
| | | | 455/552.1 |
| 2012/0135715 A1* | 5/2012 | Kang | H04W 8/183 |
| | | | 455/412.1 |
| 2012/0270602 A1 | 10/2012 | Card | |
| 2013/0005394 A1* | 1/2013 | Geary | H04W 52/028 |
| | | | 455/552.1 |
| 2013/0190051 A1 | 7/2013 | Kokkonen et al. | |
| 2013/0329639 A1 | 12/2013 | Wietfeldt et al. | |
| 2014/0044099 A1 | 2/2014 | Sfar | |
| 2014/0120859 A1 | 5/2014 | Ekici et al. | |
| 2014/0228039 A1 | 8/2014 | Zhao et al. | |
| 2014/0274006 A1* | 9/2014 | Mutya | H04W 36/14 |
| | | | 455/416 |
| 2015/0237497 A1* | 8/2015 | Chen | H04W 8/183 |
| | | | 455/558 |
| 2015/0312717 A1* | 10/2015 | Shih | H04W 8/183 |
| | | | 455/456.1 |
| 2015/0334761 A1* | 11/2015 | Liao | H04W 76/025 |
| | | | 455/552.1 |
| 2016/0037329 A1* | 2/2016 | Chong | H04W 48/18 |
| | | | 455/422.1 |

FOREIGN PATENT DOCUMENTS

| | | |
|---|---|---|
| WO | 03075543 A2 | 9/2003 |
| WO | 2011063721 A1 | 6/2011 |

OTHER PUBLICATIONS

Gichuki, M., "Performance Investigation of Automatic Multiple SIM Card Cell Phones: Optimal Quality of Service Versus Minimum Cost in Mobile Communications," <http://dl.acm.org/citation.cfm?id=2432416> Lambert Academic Publishing, Sep. 2012, Abstract Only, 2 pages.

Murtaza, M.A., et al., "Stochastic Optimal SIM Selection for Multi-SIM Cell-Phone Architecture Using Semi-Markov Decision Processes," IEEE VehicularTechnology Conference, Sep. 3-6, 2012, Quebec City, 5 pages.

Nosheen, M., et al., "Handling Multiple SIMs—A Framework Based on Software Restructuring Approach," International Conference on Communications and Mobile Computing, Apr. 18-20, 2011, 4 pages.

* cited by examiner

WIRELESS COMMUNICATION DEVICE

FIELD OF THE DISCLOSURE

The present disclosure is generally related to a wireless communication device that enables first data delivery according to a first priority, second data delivery according to second priority, or both.

BACKGROUND

A wireless communication device may send data to a destination device. For example, the wireless communication device may send the data to a base station associated with a wireless network. The base station may forward the data to the destination device via a second network. The second network may include one or more telephone networks, one or more public internet protocol networks (e.g., the internet), one or more private internet protocol networks, or combinations thereof.

DETAILED DESCRIPTION

Figure 1:
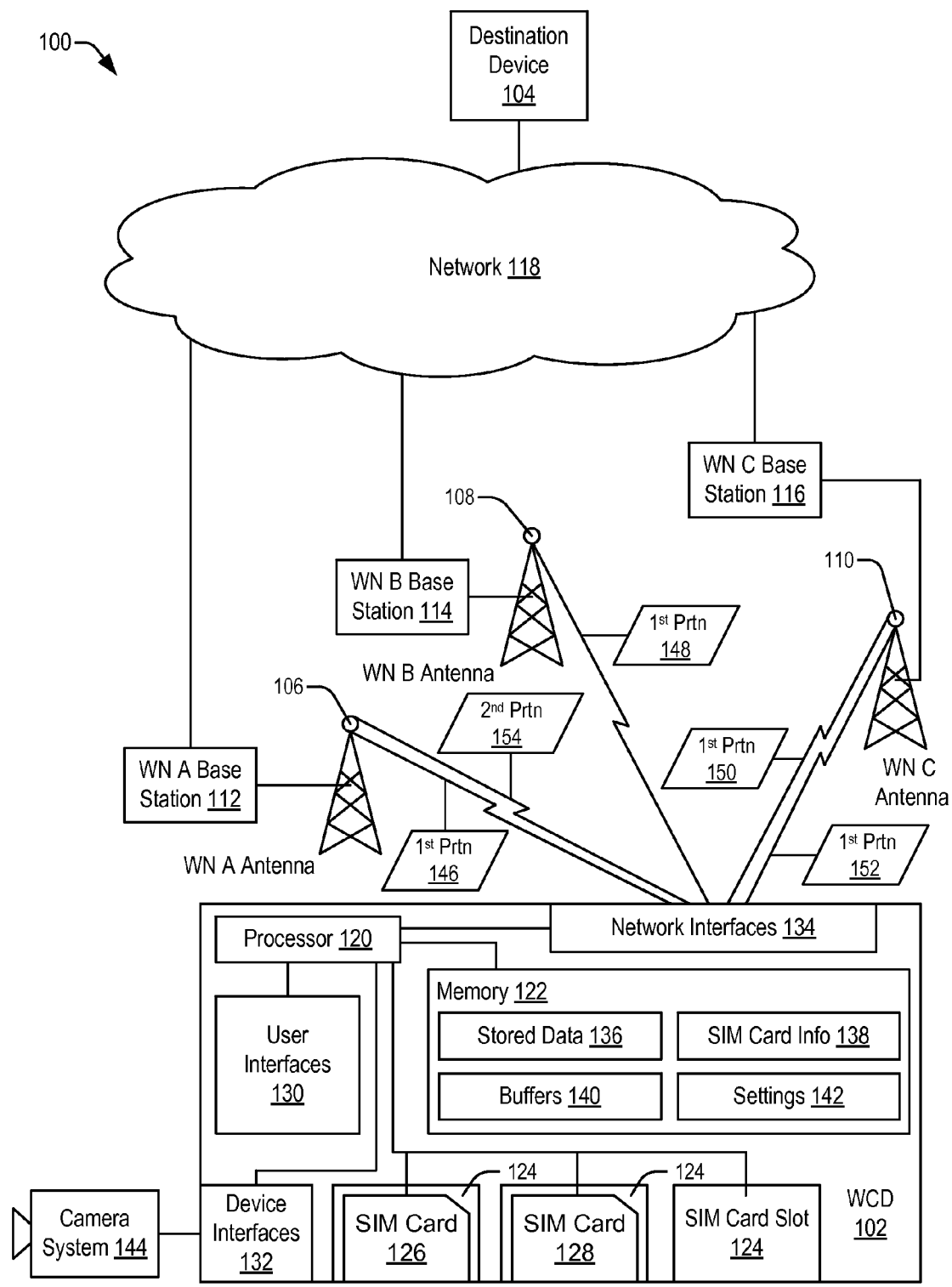
FIG. 1 is a block diagram of communication system that enables a wireless communication device to send data to a destination device.

A wireless communication device may be configured to communicate data via various communication channels and various data access categories. For example, the wireless communication device may include at least one instance of first subscriber identity module (SIM) card information that enables first data delivery according to a first priority and at least one instance of second SIM card information that enables second data delivery according to a second priority. The first priority may correspond to a non-guaranteed bit rate and the second priority may correspond to a guaranteed bit rate. The first data delivery may correspond to best-efforts data delivery and the second data delivery may correspond to quality of service (QoS) data delivery, where best-efforts and QoS refer to different access categories associated with communication.

The wireless communication device may utilize one or more instances of first SIM card information, one or more instances of second SIM card information, or both, to wirelessly send data in portions to a destination. The wireless communication device may determine which SIM card information to utilize to send the data to the destination. When quality of service provided by one or more networks associated with the at least one instance of first SIM card information is acceptable, the wireless communication device may send the data utilizing the one or more instances of first SIM card information. When the quality of service of the one or more wireless networks associated with the at least one instance of first SIM card information declines, portions of the data may be sent to the destination utilizing the one or more instances of second SIM card information to maintain transmission of the data at least at a particular data rate. The at least one instance of second SIM card information may enable the wireless communication device to send data at a reasonable data rate even when quality of service of one or more networks associated with data delivery via use of the at least one first SIM card information is low (e.g., bandwidth is less than a threshold).

In some situations, the wireless communication device may need to send a large amount of data within a particular amount of time. For example, the wireless communication device may send a media content stream to the destination device to enable playback of the media content without disruption. To enable a device to playback the media content stream without disruption, the media content stream may be delivered at least at a particular data rate. To increase a likelihood of delivery at least at the particular data rate, the wireless communication device may have access to multiple communication channels, each communication channel associated with a first instance of SIM card information (e.g., from one or more SIM cards, from a memory of the wireless communication device, or both). The SIM card information may enable the wireless communication device to send the media content stream to the destination device in portions utilizing the multiple communication channels and one or more wireless networks. The destination device may receive the portions of the data and reassemble the media content stream for playback.

Network congestion in the one or more wireless network or other network issues may disrupt or delay delivery of the data to the destination device. The wireless communication device may include access to one or more instances of second SIM card information. The one or more instances of second SIM card information may enable the wireless communication device to send data at least at a particular data rate (e.g., at a guaranteed minimum bit rate or contract QoS level) even when first data delivery via the communication channels is disrupted due to congestion or other wireless network issues in some or all of the one or more wireless networks.

In an illustrative embodiment, a method includes receiving, at a wireless communication device, a request to send data to a destination device. The method includes determining, at the wireless communication device, a value associated with quality of service of a wireless network (e.g., an estimated upload data rate for the wireless communication device using the wireless network). The wireless communication device includes first subscriber identity module card information that enables first data delivery according to a first priority via the wireless network and second subscriber identity module card information that enables second data delivery according to a second priority via the wireless network. The second data delivery provides data delivery at least at a first delivery rate. The method includes determining, at the communication device, a first portion of the data to send with the first data delivery based on the value and determining a throughput value (e.g., an estimated upload data rate for the wireless communication device using all instances of SIM card information associated with first data delivery) based on the value. The method also includes determining, at the wireless communication device, a second portion of the data to send to the destination device with the second data delivery based on the throughput value. The second portion includes none of the data when the throughput value is greater than a first threshold.

In an illustrative embodiment, a computer-readable device includes instructions executable by a processor to perform operations. The operations include receiving a request to send data to a destination device. The operations include determining a value associated with quality of service of a first wireless network (e.g., an estimated upload data rate for the wireless communication device using the wireless network). The processor has access to first subscriber identity module card information that enables first data delivery according to a first priority via the first wireless network. The processor has access to second subscriber identity module card information that enables second data delivery according to a second priority via a second wireless network, where the second data delivery provides delivery of data at least at a first delivery rate. The operations include determining a first portion of the data to send to the destination device with the first data delivery of the first wireless network based on the value. The operations include determining a throughput value (e.g., an estimated upload data rate for the wireless communication device using all instances of SIM card information associated with first data delivery) based on the value. The operations also include determining a second portion of the data to send with the second data delivery of the second wireless network. The second portion includes none of the data when the throughput is greater than a first threshold.

In an illustrative embodiment, a wireless communication device includes a processor and a memory accessible to the processor. The memory includes instructions executable by the processor to perform operations. The operations include receiving a request to send data to a destination device. The operations include, for each wireless network accessible to the processor via first subscriber identity module card information that enables data delivery according to a first priority, determining a value associated with quality of service of the wireless network (e.g., an estimated upload data rate for the wireless communication device using the wireless network). The operations include, for each instance of first subscriber identity module card information and based on the value associated with a wireless network for the instance, determining a first portion of the data to send to the destination device with first data delivery via the wireless network associated with the instance. The operations include determining a throughput value (e.g., an estimated upload data rate for the wireless communication device) based on instances of the first subscriber identity module card information. The operations also include, for each wireless network for which the wireless communication device includes second subscriber identity module card information that enables data delivery according to a second priority, determining whether to send a second portion of the data to the destination device with second data delivery via the wireless network based on the throughput value, where the second data delivery by the wireless network provides delivery of data at least at a first delivery rate, and where the second portion for the wireless network is based on the first delivery rate when a determination is to send the second portion via the wireless network.

FIG. 1 is a block diagram that illustrates a particular embodiment of a communication system 100 that enables a wireless communication device (WCD) 102 to send data to a destination device 104 via first data delivery according to a first priority, via second data delivery according to a second priority, or both. The first priority may correspond to a non-guaranteed bit rate and the second priority may correspond to a guaranteed bit rate. As an example, the first data delivery may correspond to best-efforts data delivery and the second data delivery may correspond to quality of service data delivery.

The WCD 102 may include multiple instances of subscriber identity module (SIM) card information that enables the WCD 102 to concurrently send distinct portions of the data to antennas (e.g., wireless network A antenna 106, wireless network B antenna 108, and wireless network C antenna 110) of wireless networks. The antennae 106-110 may be coupled to corresponding base stations (e.g., wireless network A base station 112, wireless network B base station 114, and wireless network C base station 116) of the wireless networks. Data packets received at a particular antenna from the WCD 102 may be passed to a corresponding base station. The corresponding base station may forward the data packets to the destination device 104 via a network 118. The network 118 may include one or more telephone networks, one or more public internet protocol networks (e.g., the internet), one or more private internet protocol networks, other networks, or combinations thereof.

Three wireless networks usable by the WCD 102 are depicted in FIG. 1 by antennae 106-110 and corresponding base stations 112-116. More or less than three wireless networks usable by the WCD 102 may be present in a particular area. Also, FIG. 1 depicts one antenna and a corresponding base station for each wireless network. Each wireless network may include many antennae and many base stations.

The WCD 102 may send data to the destination device 104. The WCD 102 may be a smartphone, a tablet computer, a laptop computer, an auxiliary device electrically coupled to another device (e.g., a camera), another type of device, or combinations thereof. The WCD 102 may include a processor 120, a memory 122, one or more SIM card slots 124, one or more SIM cards (e.g., a SIM card 126 and a SIM card 128) positioned in one or more of the SIM card slots 124, user interfaces 130, one or more device interfaces 132, and network interfaces 134. The processor 120 may execute instructions to perform operations. The operations may include sending data to the destination device 104.

The memory 122 may include stored data 136, SIM card information 138, buffers 140, and settings 142. The stored data 136 may include the instructions executable by the processor 120, media content items, test information used to determine quality of service of one or more wireless networks, downloaded data, applications, other data, or combinations thereof.

The SIM card information 138 may include one or more instances of first SIM card information that enables first data delivery, one or more instances of second SIM card information that enables second data delivery, or combinations thereof. A user of the WCD 102 may position a SIM card in an available SIM card slot 124. The SIM card may be the SIM card 126 that enables first data delivery, the SIM card 128 that enables second data delivery, or a SIM card that enables both first data delivery and second data delivery for a particular wireless network. In response to the processor 120 detecting the SIM card in the SIM card slot 124 for a first time, the user may be presented, at a particular user interface of the user interfaces 130, with a first option to use the SIM card in the SIM slot 124 and a second option to store information from the SIM card in the SIM card information 138.

When the first option is selected, the user may be presented with one or more options for settings associated with the SIM card. For example, if the SIM card is the SIM card 128 that includes second SIM card information, the user may be presented with one or more options regarding when to send data using the SIM card 128 (e.g., always use the SIM card 128 or only use the SIM card 128 when estimated throughput for the WCD 102 falls below a user defined threshold), one or more options regarding an order of use of the SIM card 128 relative to other second SIM card information available to the WCD 102, other options, or combinations thereof.

When the user selects the second option, the processor 120 may read the SIM card and store an instance of SIM card information corresponding to the SIM card in the SIM card information 138. After the instance has been stored, the user may be notified that the SIM card can be removed from the SIM card slot 124 of the WCD 102. The user may also be presented with one or more options for settings associated with the instance. For example, if the SIM card is the SIM card 126 that includes first SIM card information, the user may be presented with an option to set a value for a threshold corresponding to when to stop using first data delivery based on a quality of service for the wireless network associated with the instance, other options, or combinations thereof.

The buffers 140 may be temporary storage locations for incoming data received via the one or more device interfaces 132 and via the network interfaces 134 and may be temporary storage for outgoing data to be sent via the network interfaces 134. Each instance of SIM card information available to the WCD 102 (e.g., from a SIM card positioned in a SIM card slot 124 or an instance stored in the SIM card information 138) may be associated with one of the buffers 140.

The settings 142 may include information used during operation of the WCD 102. The settings may include default values and user set values for various options associated with the WCD 102 (e.g., threshold values associated with data delivery via the WCD 102, a default destination device, information indicative of which instances of SIM card information are active, etc.). Some or all of the values may be accessed and changed via one or more user interfaces of the user interfaces 130, via the one or more device interfaces 132, via the network interfaces 134, or via combinations thereof.

The user interfaces 130 may enable a user to input data to the WCD 102 and may enable the user to receive output from the WCD 102. The user interfaces 130 may include, but are not limited to, a display device, a touch screen, one or more indicators, a keyboard, one or more buttons, one or more switches, a microphone, one or more speakers, a camera, other devices, or combinations thereof.

The one or more device interfaces 132 may enable an external device to be coupled to the WCD 102. In an illustrative embodiment, the external device is a camera system 144. The camera system 144 may stream or otherwise provide media data to the WCD 102. The media data may include video data and audio data captured by the camera system 144. In other embodiments, the one or more device interfaces 132 may enable data connections to field equipment (e.g., oil field equipment, environmental data monitors, usage meters, implanted medical devices, video data from a camera, audio data, or combinations thereof). The field equipment may be located remotely from wireless networks or may not include an ability to wirelessly send data via a wireless network. Data from the field equipment can be transferred to the WCD 102. After transfer of the data to the WCD 102, the WCD 102 may send the data wirelessly to the destination device 104 when the WCD 102 is in range of one or more wireless networks.

The network interfaces 134 may enable the WCD 102 to wirelessly send data. The network interfaces 134 may include a plurality of transceiver and antenna pairs. The network interfaces may include a transceiver for each instance of SIM card information that is active. The transceiver and antenna pairs may enable the WCD 102 to concurrently send distinct portions of the data to the destination device 104. Each transceiver may be associated with an input buffer and an output buffer of the buffers 140.

The user of the WCD 102 may use one of the user interfaces 130 to input a command to send the data to the destination device 104. The data may be data stored in the stored data 136, data generated by the WCD 102 (e.g., video data and audio data associated with a camera and microphone of the WCD 102), data received via one of the one or more device interfaces 132 (e.g., a media content stream received from the camera system 144), or combinations thereof. The destination device 104 may be specified by the user or may be a default destination device.

The processor 120 may determine one or more wireless networks with which the WCD 102 can use first data delivery. For each of the one or more wireless networks and for a particular time period, the WCD 102 may determine a value for quality of service associated with the wireless network. To determine the value for quality of service for each wireless network, the WCD 102 may send particular data (e.g., a test pattern) via the wireless network and receive information in response to the particular data. Based on the information, the WCD 102 may determine the value for the wireless network. The value may correspond to an estimated upload data rate for the WCD 102 using the wireless network. The value may be set to zero when the value is below a threshold value. A value of zero may indicate that a response was not received or that the wireless network will process little or no data received from the WCD 102 with first data delivery via the wireless network.

For each of the one or more wireless networks associated with a value that is not zero, the processor 120 determines a first portion of the data to send to the destination device 104 during the time period via an instance of first SIM card information associated with the wireless network. For each of the one or more wireless networks, the processor 120 places the first portion of the data in an appropriate buffer of the buffers 140 when the first portion includes some of the data. The processor 120 may concurrently send each first portion via the network interfaces 134.

In the embodiment depicted in FIG. 1, the WCD 102 includes the SIM card 126 that enables first data delivery to the wireless network A base station 112, a first instance of SIM card information in the SIM card information 138 that enables first data delivery to the wireless network B base station 114, a second instance of SIM card information in the SIM card information 138 that enables first data delivery to the wireless network C base station 116, and a third instance of SIM card information in the SIM card information 138 that enables first data delivery to the wireless network C base station 116. Based on a value of quality of service for the wireless network A, the processor 120 sends a first portion of the data 146 to the wireless network A base station 112. Based on a value of quality of service for the wireless network B, the processor 120 sends another portion of the data as first portion 148 to the wireless network B base station 114. Based on a value of quality of service for the wireless network C, the processor 120 sends additional portions of the data as first portion 150 and first portion 152 to the wireless network C base station 116.

Based on instances of SIM card information associated with the one or more networks that have values that are not zero, the processor 120 may determine an estimated throughput for the WCD 102. The processor may compare the estimated throughput value to a throughput threshold. When the throughput value is less than or equal to the throughput threshold, the processor 120 may determine one or more second portions of the data to send to the destination device 104 using one or more instances of second SIM card information.

In the embodiment depicted in FIG. 1, the WCD 102 includes the SIM card 128 that enables second data delivery to wireless network A base station 106. The second data delivery enables data delivery at least at a first delivery rate and up to data delivery at a second delivery rate. The second data delivery rate may be less than a data delivery rate via first data delivery via wireless network A when the wireless network A is not congested. A service provider associated with the wireless network A and the SIM card 128 may guaranty service via second data delivery at least at the first delivery rate.

As an example, the WCD 102 is coupled to the camera system 144 and located at a concert to film the concert and conduct interviews. Thousands of people may be in attendance at the concert. During the concert, usage of the base stations 112-116 may be relatively low since most people attending the concert may be watching the concert, and the WCD 102 may be able to use first data delivery to the base stations 112-116 to send a live feed of the concert to the destination device 104. After the concert or during a break, many people may decide to use mobile communication devices and quality of service of the wireless networks associated with the base stations 112-116 may decline below a level for providing the live feed to the destination device 104 at a rate sufficient to enable broadcast of the concert without disruption. In response, the processor 120 of the WCD 102 may determine to use second data delivery in addition to the first data delivery based on the estimated throughput being less than the throughput threshold. The processor 120 determines a second portion 154 of the data to send utilizing second data delivery and sends the second portion 154 to a corresponding buffer of the buffers 140. The processor sends the second portion 154 to the wireless network A base station 112 via one of the network interfaces 134 concurrently with sending the first portions 146-152.

After the processor sends first portions 146-152 of the data, one or more second portions 154 of the data, or both, the processor 120 may determine if there is additional data to send. When there is additional data, the processor 120 may continue to determine and send first portions, second portions, or both, until all of the data is sent.

Thus, the WCD 102 may use first data delivery (e.g., best-efforts data delivery) when one or more wireless networks used by the WCD 102 are not congested and throughput of the WCD 102 is at or above a throughput threshold. The WCD 102 may automatically use second data delivery (e.g., quality of service data delivery) for at least a portion of the data sent by the WCD 102 during a time period when the one or more wireless networks are congested and throughput of the WCD 102 is below the throughput threshold. The use of first data delivery may be less expensive than second data delivery, may have a high data delivery rate during normal operations of the one or more wireless networks (e.g., higher than a data delivery rate associated with second data delivery), may have fewer restrictions than second data delivery, or combinations thereof. The use of second data delivery by the WCD 102 may enable improved performance when quality of service available from the one or more wireless networks makes first data delivery unsuitable.

Figure 2:
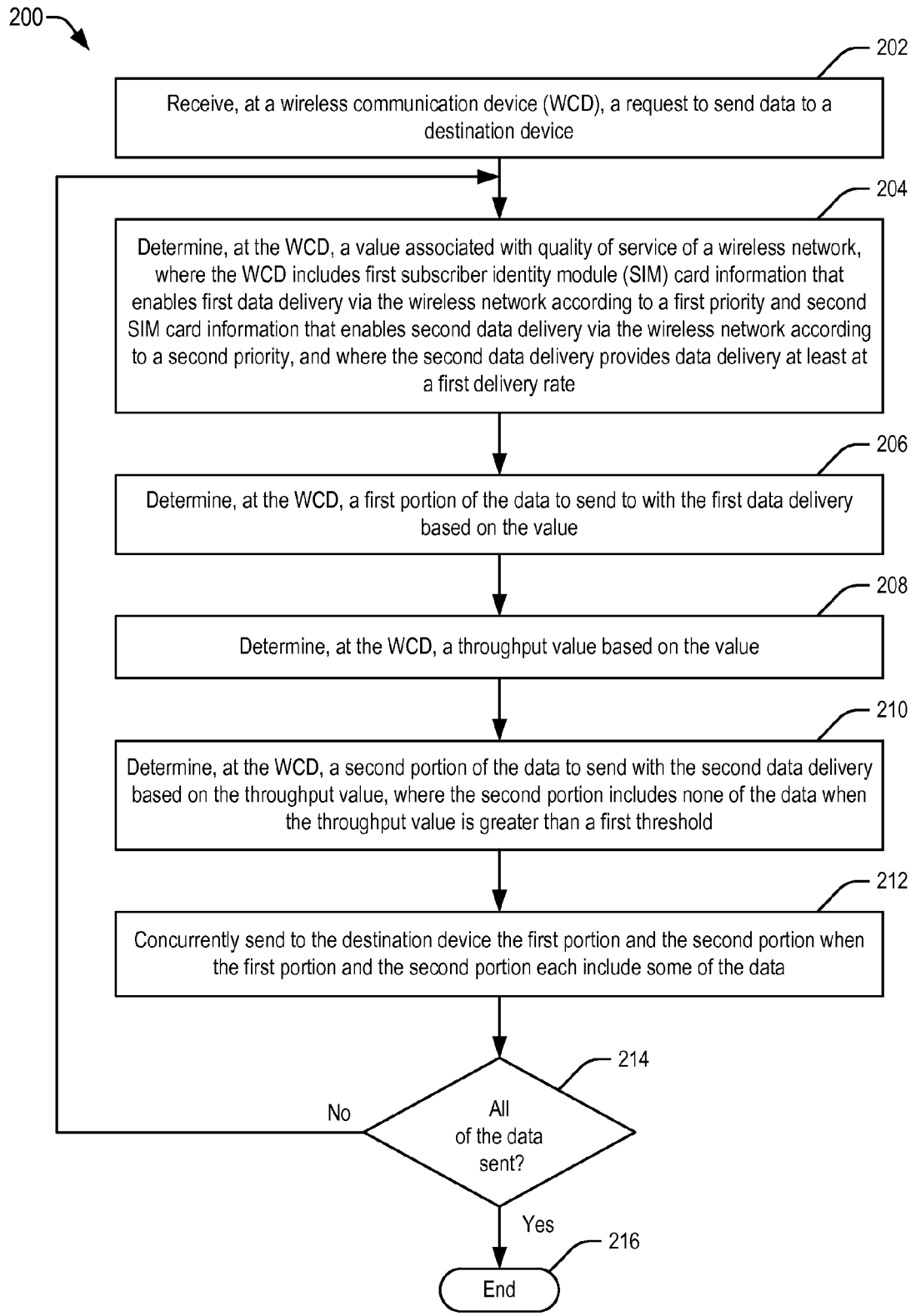
FIG. 2 is a flowchart of a first embodiment of a method of providing data delivery via a wireless communication device.

FIG. 2 depicts a flowchart of a first embodiment of a method 200 of providing data delivery via a wireless communication device (WCD). The method 200 may be performed by the WCD 102 of the system 100 of FIG. 1. The method 200 may include receiving at the WCD, a request to send data to a destination device, at 202. For example, the request may include or correspond to user input that requests that a video stream being received from a video camera, or that a video file recorded by the video camera, be sent to a destination device. The destination device may be a server associated with a media provider (e.g., a television station), an e-mail server, a storage device, or another type of device.

The method 200 may include determining, at the WCD, a value associated with quality of service of a wireless network, at 204. The WCD may include first subscriber identity module (SIM) card information that enables first delivery via the wireless network according to a first priority. The first priority may correspond to non-guaranteed upload bitrate. The first SIM card information may be accessed from a SIM card in a SIM card slot of the WCD or from a memory of the WCD. The WCD may also include second SIM card information that enables second data delivery via the wireless network according to a second priority. The second priority may correspond to a guaranteed upload bitrate. The second data delivery may provide delivery of data at least at a first delivery rate. The second SIM card information may be accessed from a SIM card in a SIM card slot of the WCD or from a memory of the WCD.

The value may be associated with an ability of the WCD to utilize the wireless network. The value may be a function of congestion associated with one or more base stations of the wireless network utilized by the WCD, with signal strength between the WCD and the one or more base stations, signal interference, latency, packet loss, other factors, or combinations thereof. The value may correspond to an estimated upload data rate for the WCD using the wireless network. The value may be set to zero when the value is below a threshold value. A value of zero may indicate that the wireless network will process little or no data received from the WCD with first data delivery via the wireless network.

The WCD may send particular data and receive information in response to the particular data. Based on the information, the WCD may determine the value for the wireless network. The value may correspond to an estimated upload data rate for the WCD using the wireless network.

In an embodiment, the particular data is a query to a network device of the wireless network. The network device may be the base station or a dedicated network device that monitors performance of the wireless network. The network device may return information to the WCD in response to the query. The information may include an expected upload data rate for the WCD and trend information related to data rate change. The value may be the expected upload data rate or an adjusted upload data rate based on the trend information.

In another embodiment, the particular data is test information sent to a particular device using first data delivery. The particular device may be the destination device. The test information may include a ping, test data, a time when the test information is sent, other content, or combinations thereof. The particular device may receive the test information and return a response. The WCD may determine an elapsed time from sending the test information to receiving the response. The response may include analysis information based on the test information, performance metrics associated with packets corresponding to the test information, comparisons to previous test information, or combinations thereof. Based on the response, the elapsed time, or both, the WCD may determine the value.

After determining the value, the WCD may determine a first portion of the data to send with first data delivery based on the value, at 206. The first portion may be sent during a particular time period. When the value is less than a value threshold, the first portion may include none of the data and the value may be set to zero. When the first portion includes some of the data, the WCD may transfer or copy the first portion to a buffer associated with first delivery via the wireless network.

The WCD may determine a throughput value based on the value, at 208. In an embodiment, the WCD includes the first SIM card information and includes no other instance of SIM card information that enables first data delivery. For this embodiment, the throughput value may be the same as the value.

In other embodiments, the WCD may include one or more instances of SIM card information that enables access to one or more wireless networks for first data delivery in addition to the wireless network. Also, the WCD may include multiple instances of SIM card information that enables first data delivery for the wireless network or for one or more particular wireless networks of the one or more wireless networks. The WCD may determine a value corresponding to quality of service for each wireless network associated with SIM card information that enables first data delivery accessible to the WCD. The throughput value may be determined by adding determined values associated with wireless networks for each instance of SIM card information accessible to the WCD that enables first data delivery or by some other calculation. For example, the WCD may include the first SIM card information for the wireless network, two instances of SIM card information that enables first data delivery for a second wireless network, and one instance of SIM card information that enables first data delivery for a third wireless network. The throughput value may be the value associated with the wireless network plus two times a value associated with the second network plus a value associated with the third wireless network.

The WCD may determine a second portion of the data to send with the second data delivery based on the throughput value, at 210. The second portion may be based on the first delivery rate. A service provider associated with the wireless network may charge higher data fees for data sent using the second data delivery than for the same amount of data sent using first data delivery via the wireless network. In some embodiments, the WCD may use the second data delivery only when certain conditions are met to avoid or reduce the data fees. For example, in an embodiment, the WCS does not use the second data delivery and only uses first data delivery when the throughput value is at or above a first threshold, uses both the second data delivery and the first data delivery when the throughput value is below the first threshold, and uses only second data delivery when the values for quality of service of wireless networks for each instance of first SIM card information of the WCD is at or below a second threshold (e.g., zero). When the data includes video data, the first threshold may be associated with a throughput that enables uninterrupted playback, or uninterrupted streaming, of the video data from the data received by the destination device. In a particular embodiment, the second data delivery is used regardless of the throughput value based on device settings of the WCD. Whether the WCD uses second data delivery regardless of the throughput may be changed by changing device settings of the WCD.

The second portion may be sent to a buffer associated with the second data delivery by the wireless network when the second portion includes some of the data. The WCD may packetize data in buffers that include portions of the data to be sent to the destination device during the particular time period into data packets. For each first portion and second portion that is to be sent to the destination device during the particular time period, headers for the data packets may include identification information that enables the destination device to reassemble the first portions and the second portions and to put the first portions and the second portions in an appropriate order to reform the data.

When the buffers of the WCD only include one or more first portions of the data to be sent to the destination device by first data delivery during the time period, the WCD may send the one or more first portions to the destination device. When the buffers of the WCD include one or more first portions of the data to be sent to the destination device by first data delivery during the time period and the second portion of the data to be sent to the destination device by second data delivery during the time period, the WCD may concurrently send the one or more first portions and the second portion to the destination device, at 212. When the buffers of the WCD only include the second portion of the data to be sent to the destination device by second data delivery during the time period, the WCD may send the second portion to the destination device.

The WCD may determine whether all of the data has been sent, at 214. When all of the data has not been sent, the method 200 may return to 204. When all of the data has been sent, the method 200 may end at 216.

The wireless network may be a third generation (3G) network, a fourth generation (4G) network, a long term evolution (LTE) network, a LTE advanced (LTE-A) network, or another type of network that supports communication of internet protocol data packets. The wireless network may be associated with a service provider.

The service provider may be associated with wireless networks of varying capabilities. An instance of SIM card information associated with the service provider may enable access to one or more of the wireless networks. For example, a particular instance of SIM card information that enables second data delivery may be associated with a particular service provider. The particular service provider may provide wireless access via a LTE network and a 3G network. In some embodiments, second data delivery associated with the particular service provider is available only via the LTE network. The WCD may disable second data delivery via the second SIM card information when the LTE network is unavailable. In other embodiments, the particular service provider may provide second data delivery via a different wireless network (e.g., the 3G network) when the LTE network is not available. The different wireless network associated with the service provider may provide second data delivery at a second delivery rate. The second delivery rate may be less than the first delivery rate associated with the LTE network.

Thus, the method 200 of FIG. 2 enables delivery of data from the WCD via the wireless network. The data may be delivered via first data delivery, via second data delivery, or via a combination thereof. A portion of the data sent by the WCD during the particular time period may be based on a value associated with quality of service of the wireless network using first data delivery from the WCD, based on an estimate of throughput of the WCD using first data delivery from the WCD, or combinations thereof.

Figure 3:
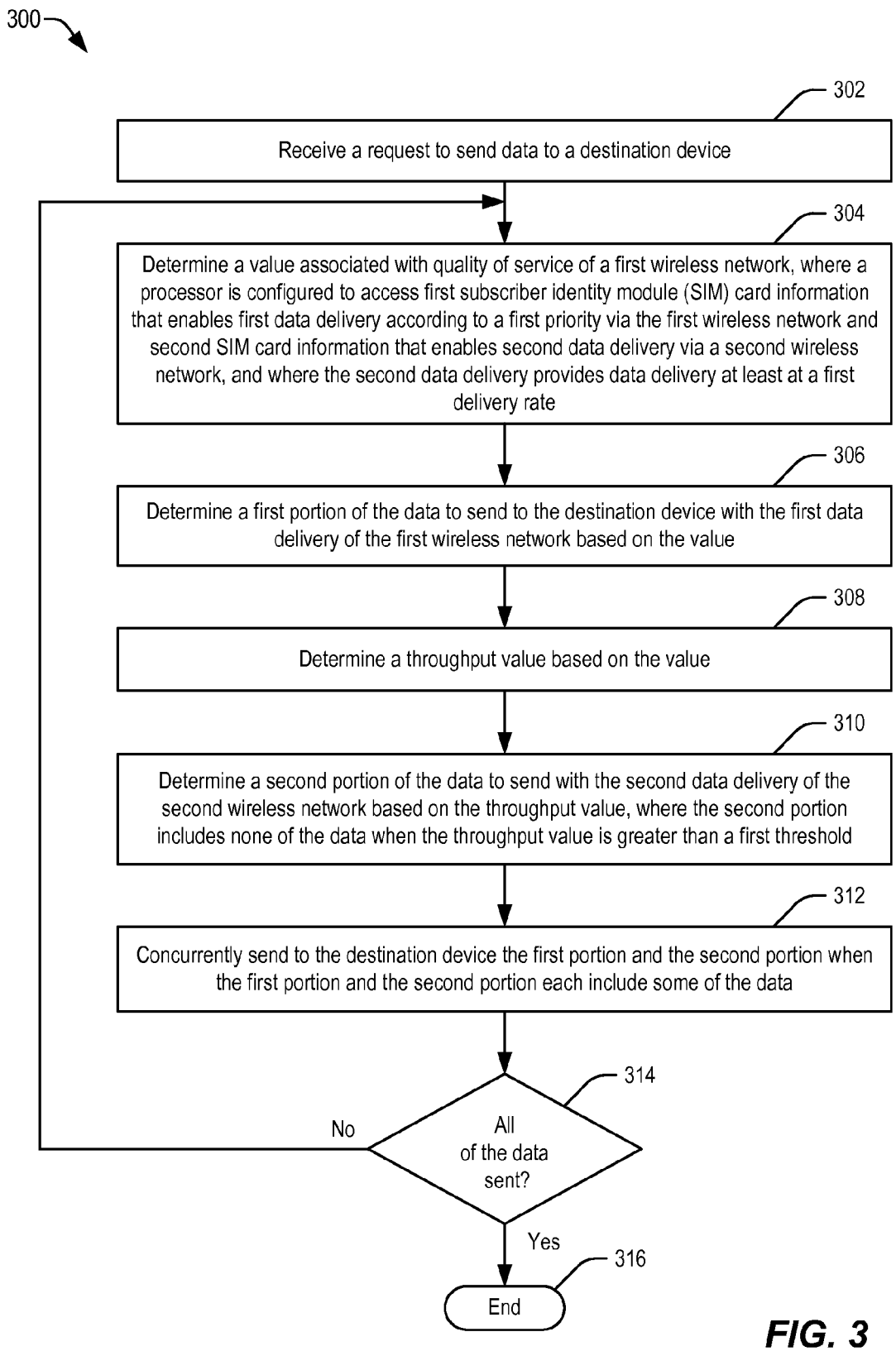
FIG. 3 is a flowchart of a second embodiment of a method of providing data delivery via a wireless communication device.

FIG. 3 depicts a flowchart of a second embodiment of a method 300 of providing data delivery via a wireless communication device (WCD). The method 300 may be performed by a processor 120 of the WCD 102 of the system 100 of FIG. 1. The processor may execute instructions stored in a storage device to perform operations. The method 300 may include receiving a request to send particular data to a destination device, at 302. For example, the request may include or correspond to user input that requests that a video stream being received from a video camera, or that a video file recorded by the video camera, be sent to a destination device. The destination device may be a server associated with a media provider (e.g., a television station), an e-mail server, a storage device, or another type of device.

The method 300 may include determining a value associated with quality of service of a first wireless network, at 304. The processor may access first subscriber identity module (SIM) card information that enables first data delivery via the first wireless network according to a first priority. The first priority may correspond to non-guaranteed upload bitrate. The first SIM card information may be accessed from a SIM card in a SIM card slot of the WCD or from a memory accessible to the processor. The processor may also include or have access to second SIM card information that enables second data delivery via a second wireless network according to a second priority. The second priority may correspond to a guaranteed upload bitrate. The second data delivery may provide delivery of data at least at a first delivery rate. The second SIM card information may be accessed from a SIM card in a SIM card slot of the WCD or from a memory accessible to the processor.

Second data delivery may be associated with a capped range from a second delivery rate to the first delivery rate (e.g., based on a service provider agreement). The first delivery rate and the second data rate may be significantly lower than a delivery rate associated with first data delivery via the wireless network when a quality of service associated with first data delivery for the wireless network is high. For example, the second delivery rate may be less than one half, one third, one quarter, or another fraction of the delivery rate associated with first data delivery via the wireless network when the quality of service associated with first data delivery for the wireless network is high.

The value may be associated with an ability to communicate via the first wireless network. The value may be a function of congestion associated with one or more base stations of the first wireless network in communication with the processor, with signal strength, signal interference, latency, packet loss, other factors, or combinations thereof. The value may correspond to an estimated upload data rate using first data delivery via the first wireless network. The value may correspond to an estimated upload data rate for the WCD using the wireless network. The value may be set to zero when the value is below a threshold value. A value of zero may indicate that the wireless network will process little or no data received from the WCD with first data delivery via the wireless network.

After determining the value, the processor may determine a first portion of the data to send with first data delivery via the first wireless network based on the value, at 306. The first portion may be sent during a particular time period. When the value is less than a value threshold, the first portion may include none of the data and the value may be set to zero. When the first portion includes some of the data, the processor may transfer or copy the first portion to a buffer associated with first delivery via the first wireless network.

The processor may determine a throughput value based on the value, at 308. In an embodiment, the processor has access to the first SIM card information and has no access to other instances of SIM card information that enable firs data delivery. For this embodiment, the throughput value may be same as the value.

In other embodiments, the processor may access one or more instances of SIM card information that enable access to one or more wireless networks for first data delivery in addition to the first wireless network. Also, the processor may access multiple instances of SIM card information that enables first data delivery for the first wireless network or for one or more particular wireless networks of the one or more wireless networks. The processor may determine a value corresponding to quality of service for each wireless network associated with SIM card information that enables first data delivery accessible to the processor. The throughput value may be determined by adding determined values associated with wireless networks for each instance of SIM card information accessible to the processor that enables first data delivery or by other calculations. For example, the processor may have access to the first SIM card information for the first wireless network, a second instance of SIM card information that enables first data delivery for the first wireless network, and one instance of SIM card information that enables first data delivery for a third wireless network. The throughput value may be twice the value associated with the first wireless network plus a value associated with the third wireless network.

The processor may determine a second portion of the data to send with the second data delivery of the second wireless network based on the throughput value, at 310. The second portion may be based on the first delivery rate. A service provider associated with the second wireless network may charge higher data fees for data sent using the second data delivery via the second wireless network than a second service provider charges for the same amount of data sent using first data delivery via the first wireless network. In some embodiments, the processor may use the second data delivery only when certain conditions are met to avoid or reduce the data fees. For example, in an embodiment, the processor does not use the second data delivery and only uses the first data delivery when the throughput value is at or above a first threshold, uses both the second data delivery and the first data delivery when the throughput value is below the first threshold, and uses only second data delivery when values for quality of service of wireless networks for each instance of first SIM card information accessible to processor are at or below second thresholds (e.g., zero). In a particular embodiment, the second data delivery via the second wireless network is used regardless of the throughput value based on device settings of the WCD. Whether the processor uses second data delivery regardless of the throughput value may be changed by changing device settings associated with the processor.

The second portion may be sent to a buffer associated with the second data delivery by the second wireless network when the second portion includes some of the data. The processor may packetize data in buffers that include portions of the data to be sent to the destination device during the particular time period into data packets. For each first portion and second portion that is to be sent to the destination device during the particular time period, headers for the data packets may include identification information that enables the destination device to reassemble the first portions and the second portions and to put the first portions and the second portions in an appropriate order to reform the data.

When the buffers of the WCD only include one or more first portions of the data to be sent to the destination device by first data delivery during the time period, the processor may send the one or more first portions to the destination device. When the buffers of the WCD include one or more first portions of the data to be sent to the destination device by first data delivery during the time period and the second portion of the data to be sent to the destination device by second data delivery during the time period, the processor may concurrently send the first portion and the second portion to the destination device, at 312. When the buffers of the WCD only include the second portion of the data to be sent to the destination device by second data delivery during the time period, the processor may send the second portion to the destination device.

The processor may determine whether all of the data has been sent, at 314. When all of the data has not been sent, the method 300 may return to 304. When all of the data has been sent, the method 300 may end at 316.

Thus, the method 300 of FIG. 3 enables delivery of portions of data from the WCD via a first wireless network and a second wireless network during the particular time period. The data may be delivered with first data delivery via the first wireless network, with second data delivery via the second wireless network, or with a combination thereof. A portion of the data sent by the WCD during the particular time period may be based on a value associated with quality of service of the first wireless network for the WCD, based on an estimate of throughput of the WCD using first data delivery, or combinations thereof.

Figure 4:
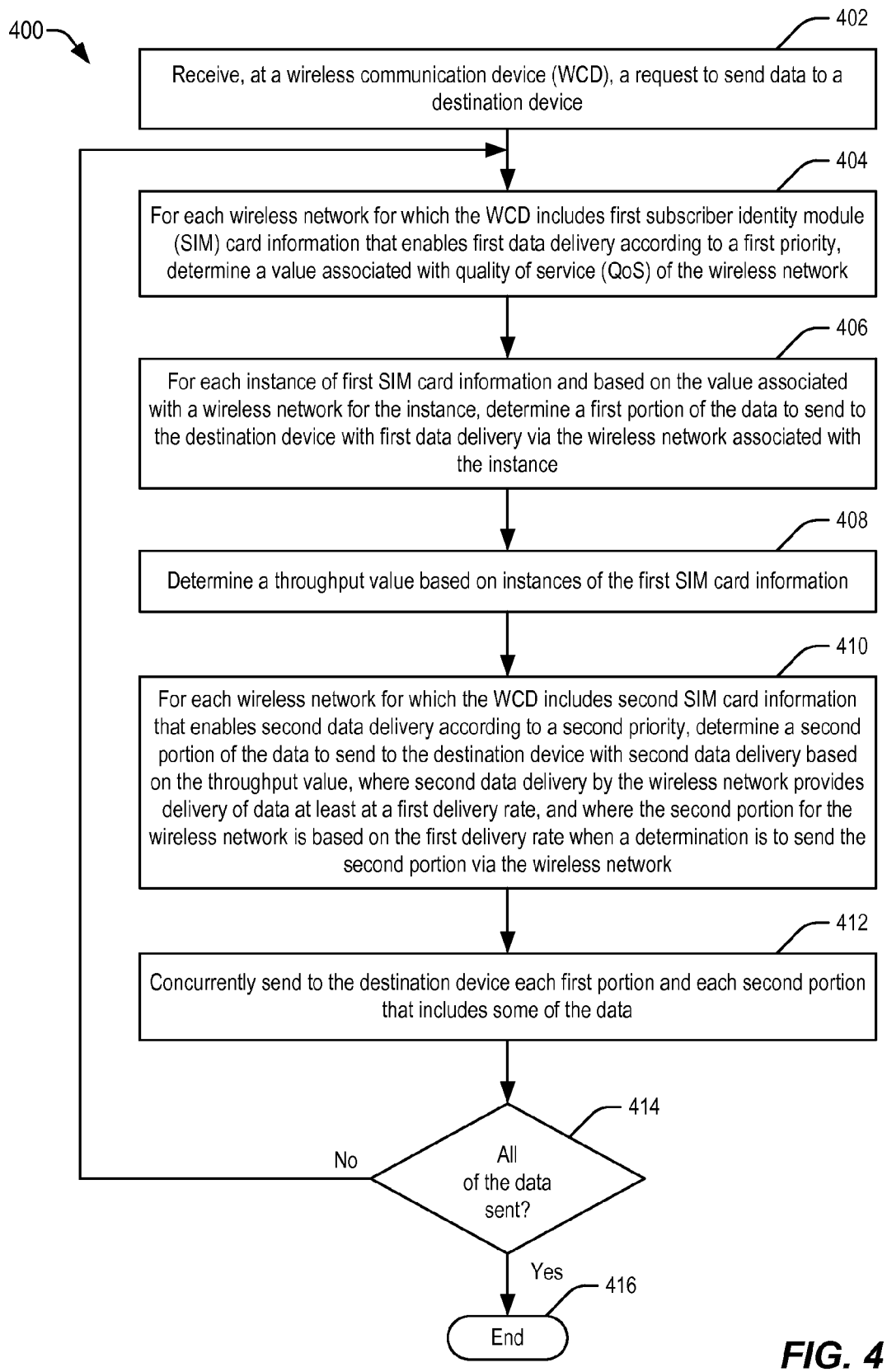
FIG. 4 is a flowchart of a third embodiment of a method of providing data delivery via a wireless communication device.

FIG. 4 depicts a flowchart of a third embodiment of a method 400 of providing data delivery via a wireless communication device (WCD). The method 400 may be performed by the WCD 102 of the system 100 of FIG. 1. The method 400 may include receiving at the wireless communication device, a request to send data to a destination device, at 402. The destination device may be a server, a storage device, or another type of device.

The method 400 may include, for each wireless network for which the WCD includes first SIM card information that enables first data delivery according to a first priority, determining a value associated with QoS of the wireless network, at 404. The first priority may correspond to non-guaranteed upload bitrate. The value for a particular wireless network may be associated with an ability of the WCD to utilize the particular wireless network. The value for the particular wireless network may be a function of congestion associated with one or more base stations of the particular wireless network utilized by the WCD, with signal strength between the WCD and the one or more base stations of the particular wireless network, signal interference, latency, packet loss, other factors, or combinations thereof. The value for the particular wireless network may correspond to an estimated upload data rate using the particular wireless network. The value may be set to zero when the value is below a threshold value. A value of zero may indicate that the wireless network will process little or no data received from the WCD with first data delivery via the wireless network.

For each instance of first SIM card information and based on the value associated with QoS for each instance of first SIM card information, the WCD may determine a first portion of the data to send with first data delivery via a particular wireless network associated with the first SIM card information, at 406. Each first portion may be sent during a particular time period. When a particular value associated with a particular wireless network is less than a value threshold associated with the particular wireless network, the first portion for the particular wireless network may include none of the data and the particular value may be set to zero. For each first portion that includes some of the data, the WCD may transfer the first portion to a buffer associated with first data delivery via the wireless network associated with the first portion.

The WCD may determine a throughput value based on instances of the first SIM card information, at 408. The throughput value may be determined by adding values associated with wireless networks associated with first SIM card information for each instance of the first SIM card information or by another calculation.

For each wireless network for which the WCD includes second SIM card information that enables second data delivery according to a second priority, the WCD may determine a second portion of the data to send to the destination device with second data delivery based on the throughput value, at 410. The second priority may correspond to a guaranteed upload bitrate. The determination to send one or more second portions with second data delivery may be based on a comparison of the throughput value to a throughput threshold. When the throughput value is at or above the throughput threshold, the WCD may use first data delivery to send portions of the data to the destination device without the use of second data delivery.

When the throughput value is below the throughput threshold, the WCD may determine to use second data delivery via a first wireless network associated with a first instance of second SIM card information in addition to first data delivery or in lieu of first data delivery. The first instance of second SIM card information may enable second data delivery by the first wireless network at least at a first delivery rate. The second portion for the wireless network may be based on the first delivery rate. The WCD may determine an adjusted throughput value by adding the first delivery rate to the throughput value. The WCD may compare the adjusted throughput value to the throughput threshold. When the adjusted throughput value equals or exceeds the throughput threshold, the WCD may determine that second portions associated with one or more additional wireless networks for which the WCD has instances of second SIM card information are not needed.

When the adjusted throughput is less than the throughput threshold, the WCD may determine to use second data delivery via a second wireless network associated with a second instance of second SIM card information in addition to the first data delivery and the first data delivery via the first wireless network. Similar determinations may be made for each additional wireless network associated with an instance of second SIM card information available to the WCD until the adjusted throughput is greater than the throughput threshold, until all wireless networks associated with instances of second SIM card information available to the WCD are utilized, or both. An order of use of wireless networks corresponding to available instances of second SIM card information may be based on data costs associated with second delivery via particular wireless networks, based on first delivery rates associated with the wireless networks, based on user input, based on other factors, or based on combinations thereof. For each second portion that includes some of the data, the WCD may transfer the second portion to a buffer associated with second delivery via the wireless network associated with the second portion.

The WCD may packetize data in buffers that include portions of the data to be sent to the destination device during the particular time period into data packets. For each first portion and each second portion that is to be sent to the destination device during the particular time period, headers for the data packets may include identification information that enables the destination device to reassemble the first portions and the second portions and to put the first portions and the second portions in an appropriate order to reform the data.

When the buffers of the WCD only include one or more first portions of the data to be sent to the destination device by first data delivery during the time period, the WCD may send the one or more first portions to the destination device. When the buffers of the WCD include one or more first portions of the data to be sent to the destination device by first data delivery during the time period and one or more second portions of the data to be sent to the destination device by second data delivery during the time period, the WCD may concurrently send to the destination device the one or more first portions and the one or more second portions, at 412. When the buffers of the WCD only include one or more second portions of the data to be sent to the destination device by second data delivery during the time period, the WCD may send the one or more second portions to the destination device.

The WCD may determine whether all of the data has been sent, at 414. When all of the data has not been sent, the method 400 may return to 404. When all of the data has been sent, the method 400 may end at 416.

Thus, the method 400 of FIG. 4 enables delivery of data from the WCD via first data delivery of one or more wireless networks, via second data delivery via one or more wireless networks, or combinations thereof. The WCD may include one or more instances of first SIM card information and one or more instances of second SIM card information.

Various embodiments disclosed herein describe providing data from a wireless communication device using first data delivery (e.g., best-efforts data delivery, using second data delivery (e.g., quality of service data delivery), or using combinations thereof. At least one instance of second SIM card information may enable the wireless communication device to send data at a reasonable data rate even when quality of service of one or more networks associated with first data delivery via use of one or more instances of first SIM card information is low. For example, the at least one instance of second SIM card information may enable transmission of live video feed from a location via one or more wireless networks even when first data delivery using one or more instances of first SIM card information is too slow to support transmission of the live video feed.

Figure 5:
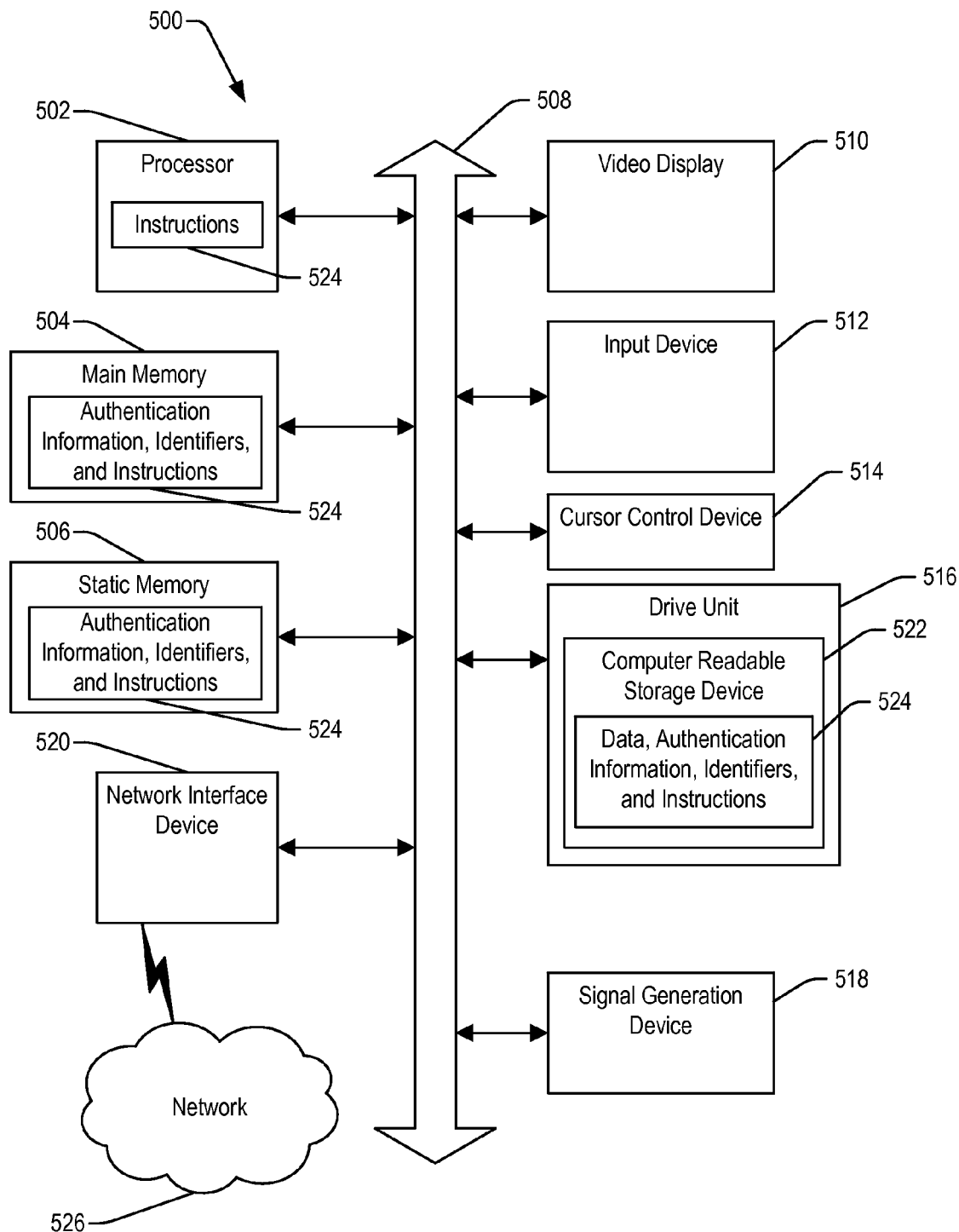
FIG. 5 is a block diagram of an illustrative embodiment of a general computer system.

Referring to FIG. 5, an illustrative embodiment of a general computer system is shown and is designated 500. The computer system 500 includes a set of instructions (e.g., the instructions 524 in the memory 504) that can be executed to cause the computer system 500 to perform any one or more of the methods or computer based functions disclosed herein. The computer system 500 may operate as a standalone device or may be connected (e.g., using a network) to other computer systems or peripheral devices. For example, the computer system 500 may include or may be included within any one or more of the wireless communication device 102, the destination device 104, the base stations 112-116, the camera system 144, or combinations thereof described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a media playback device, a customer premises equipment device, an endpoint device, a web appliance, or any other machine capable of executing a set of instructions (sequential or otherwise) that specify actions to be taken by that machine. In a particular embodiment, the computer system 500 may be implemented using electronic devices that provide video, audio, data communication, or combinations thereof. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502 (e.g., a central processing unit (CPU), a graphics processing unit (GPU), or both). Moreover, the computer system 500 may include a main memory 504 and a static memory 506, which can communicate with each other via a bus 508. As shown, the computer system 500 may further include a video display unit 510, such as a liquid crystal display (LCD), a light emitting diode (LED) display, a touch screen display, a flat panel display, a solid state display, or a lamp assembly of a projection system. Additionally, the computer system 500 may include an input device 512, such as a remote control device (e.g., a television remote or a set-top box remote), a keyboard, a joystick, another type of input device, or combinations thereof. In addition, the computer system 500 may include a cursor control device 514 (e.g., a mouse). In some embodiments, the input device 512 and the cursor control device 514 may be integrated into a single device, such as a capacitive touch screen input device. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable storage device 522 in which SIM card information can be embedded. The computer-readable storage device 522 may be a SIM card positioned in a SIM card slot, random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 524 may embody one or more of the methods or logic as described herein. The instructions 524 may be executable by the processor 502 to perform one or more functions or methods described herein, such as the methods 200, 300, and 400 described with reference to FIGS. 2-4, respectively. In a particular embodiment, data (e.g., information corresponding to a media content item), SIM card information, identifiers, and instructions (e.g., instructions to enable data to be sent in data portions to a destination via one or more wireless networks) 524 may reside completely, or at least partially, within the main memory 504, the static memory 506, and/or within the processor 502 during execution by the computer system 500. The main memory 504 and the processor 502 also may include a computer-readable storage device. Authentication information from the SIM card information in the drive unit 516, the main memory 504, the static memory 506, the processor 502, accessed from a SIM card in a SIM card slot, or combinations thereof may be transmitted to another computer system to enable authentication of the computer system 500.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 500 may communicate with one or more external systems via a network 526. First data stored by the computer-readable storage device 522 may be sent to the one or more external systems via the network 526. Also, second data may be received by the computer system 500 via the network 526. The second data may be stored by the processor 524 to the computer-readable storage device. Additionally, while the computer-readable storage device 522 is shown to be a single device, the computer-readable storage device 522 may be a single device or may be multiple devices, such as a centralized or distributed database, and/or associated caches and servers that store one or more sets of instructions. The computer-readable storage device 522 is capable of storing a set of instructions for execution by the processor 502 to cause the computer system 500 to perform any one or more of the methods or operations disclosed herein.

In a particular non-limiting, exemplary embodiment, the computer-readable storage device 522 may include a solid-state memory such as embedded memory (or a memory card or other package that houses one or more non-volatile read-only memories). Further, the computer-readable storage device 522 may include a random access memory or other volatile re-writable memory. Additionally, the computer-readable storage device 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a wireless communication device, a request to send data to a destination device;
   determining, at the wireless communication device, a value associated with quality of service of a wireless network, wherein the wireless communication device includes first subscriber identity module card information that enables first data delivery according to a first priority via the wireless network and second subscriber identity module card information that enables second data delivery according to a second priority via the wireless network, and wherein the second data delivery provides data delivery at least at a first delivery rate;
   determining, at the wireless communication device, a first portion of the data to send with the first data delivery based on the value;
   determining, at the wireless communication device, a throughput value based on the value;
   determining, at the wireless communication device, a second portion of the data to send to the destination device with the second data delivery based on the throughput value, wherein the second portion includes none of the data when the throughput value is greater than a first threshold;
   determining a second value associated with quality of service of a second wireless network, wherein a second instance of first subscriber identity module card information of the wireless communication device enables first data delivery via the second wireless network;
   determining, based on the second value, a third portion of the data to send to the destination device with the first data delivery of the second wireless network concurrently with the first portion, the second portion, or both, based on the second value; and
   sending the third portion to the destination device with the first data delivery using the second instance of first subscriber identity module card information and the second wireless network.

2. The method of claim 1, further comprising, when the first portion and the second portion each include some of the data, concurrently sending the first portion to the destination device with the first data delivery using the first subscriber identity module card information and the second portion to the destination device with the second data delivery using the second subscriber identity module card information.

3. The method of claim 1, wherein the first portion does not include some of the data when the value is less than a second threshold.

4. The method of claim 1, wherein the first priority is a first network priority of the first data delivery, and wherein the second priority is a second network priority of the second data delivery.

5. The method of claim 1, wherein the wireless communication device includes a second instance of second subscriber identity module card information that enables second data delivery via the second wireless network, wherein the second data delivery with the second wireless network provides delivery of data at least at a second delivery rate, and further comprising determining a fourth portion of the data to send with the second data delivery with the second wireless network based on the throughput value, wherein the fourth portion includes none of the data when the throughput value is greater than the first threshold.

6. The method of claim 1, wherein determining the value comprises:
   sending a query to a network device of the wireless network;
   receiving information from the network device in response to the query; and
   determining the value based on the information.

7. The method of claim 6, wherein the information includes trend data indicating a rate of change of quality of service provided by the wireless network.

8. The method of claim 1, wherein determining the value includes:
   sending test data from the wireless communication device to a particular device via the first data delivery;
   determining an amount of time that passes before receipt of a response to the test data; and
   determining the value based on the amount of time, the response, or both.

9. The method of claim 1, wherein the wireless network is a long term evolution network.

10. The method of claim 9, wherein the second subscriber identity module card information provides reduced second delivery via the second wireless network when the wireless network is unavailable, and wherein the reduced second delivery provides delivery of data at least at a second particular delivery rate.

11. The method of claim 1, wherein the data includes a video feed from a camera, data from field equipment, or combination thereof.

12. A computer-readable storage device comprising instructions executable by a processor to perform operations including:
   receiving a request to send data to a destination device;
   determining a value associated with quality of service of a first wireless network, wherein the processor is configured to access first subscriber identity module card information that enables first data delivery according to a first priority via the first wireless network, wherein the processor is able to access second subscriber identity module card information that enables second data delivery according to a second priority via a first wireless network, and wherein the second data delivery provides delivery of data at least at a first delivery rate;

determining a first portion of the data to send to the destination device with the first data delivery of the first wireless network based on the value;
determining a throughput value based on the value;
determining a second portion of the data to send with the second data delivery of the first wireless network, wherein the second portion includes none of the data when the throughput value is greater than a first threshold;
determining a second value associated with quality of service of a second wireless network, wherein a second instance of first subscriber identity module card information enables first data delivery via the second wireless network;
determining, based on the second value, a third portion of the data to send to the destination device with the first data delivery of the second wireless network concurrently with the first portion, the second portion, or both, based on the second value; and
sending the third portion to the destination device with the first data delivery using the second instance of first subscriber identity module card information and the second wireless network.

13. The computer-readable storage device of claim 12, wherein, when the first portion and the second portion each include some of the data, the operations further include concurrently sending the first portion to the destination device via the first wireless network with first data delivery using the first subscriber identity module card information and the second portion to the destination device via the second wireless network with second data delivery using the second subscriber identity module card information.

14. The computer-readable storage device of claim 12, wherein the second portion is determined based on the first delivery rate.

15. The computer-readable storage device of claim 12, wherein a delivery rate of data via the second data delivery is in a capped range from the first delivery rate to a second delivery rate greater than the first delivery rate.

16. The computer-readable storage device of claim 12, wherein the first data delivery corresponds to best-efforts data delivery, and wherein the second data delivery corresponds to quality of service data delivery.

17. A wireless communication device comprising:
a processor,
memory accessible to the processor, the memory comprising instructions executable by the processor to perform operations including:
receiving a request to send data to a destination device;
determining a value associated with quality of service of a wireless network;
determining a first portion of the data to send to the destination device with first data delivery via the wireless network, wherein first subscriber identity module card information enables the first data delivery according to a first priority via the wireless network;
determining a throughput value based on the value;
determining a second portion of the data to send to the destination device with second data delivery based on the throughput value, wherein second subscriber identity module card information enables second data delivery according to a second priority via the wireless network, and wherein the second portion includes none of the data when the throughput value is greater than a first threshold;
determining a second value associated with quality of service of a second wireless network, wherein a second instance of first subscriber identity module card information enables first data delivery via the second wireless network;
determining, based on the second value, a third portion of the data to send to the destination device with the first data delivery of the second network concurrently with the first portion, the second portion, or both, based on the second value; and
sending the third portion to the destination device with the first data delivery using the second instance of first subscriber identity module card information and the second wireless network.

18. The device of claim 17, wherein, in response to the throughput value indicating greater than a first threshold of throughput, the operations further include sending a particular portion of the data with first data delivery using the first subscriber identity module card information during a particular time period without sending any portion of the data with second data delivery during the time period.

19. The device of claim 17, further comprising a subscriber identity module card slot, wherein the second subscriber identity module card information is accessible from a subscriber identity module card positioned in the subscriber identity module card slot.

20. The device of claim 17, wherein the second subscriber identity module card information is accessible from the memory.

* * * * *